March 9, 1926.
G. L. HEDGES ET AL
1,576,276
AUTOMATIC ELECTRIC SWITCH AND CIRCUIT
Filed Dec. 20, 1922      3 Sheets-Sheet 1
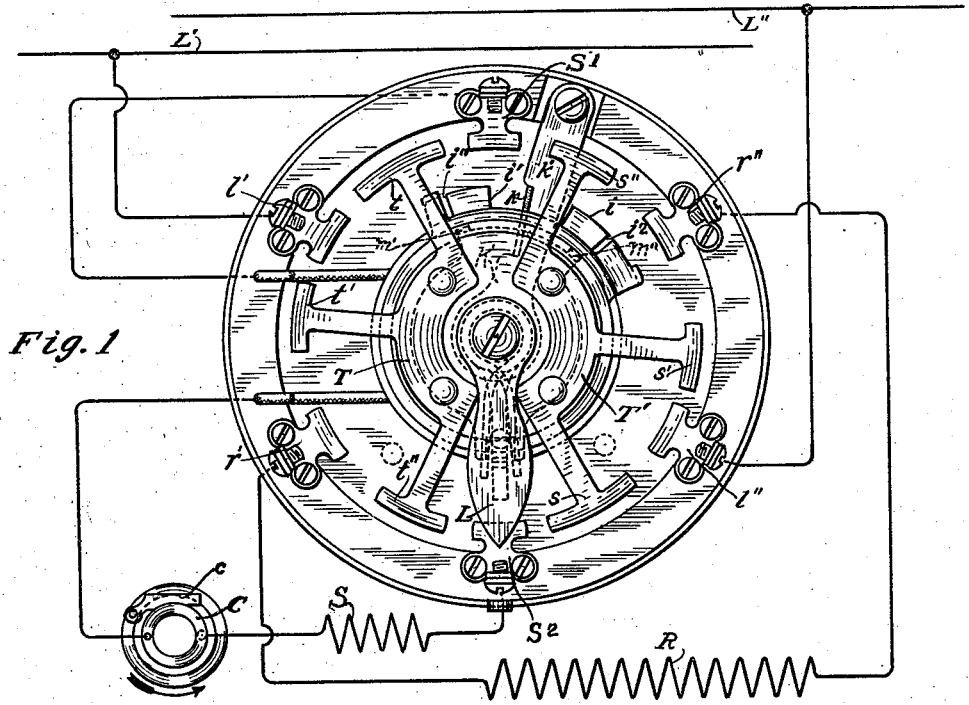
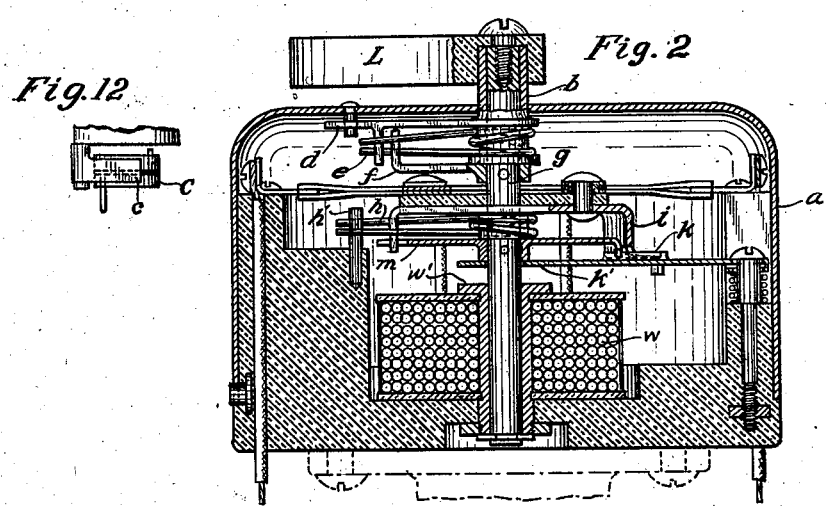
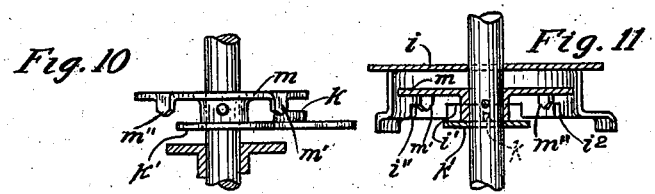
INVENTORS.
George L. Hedges
Eugene F. Martinet
ATTORNEY.

March 9, 1926.  1,576,276
G. L. HEDGES ET AL
AUTOMATIC ELECTRIC SWITCH AND CIRCUIT
Filed Dec. 20, 1922   3 Sheets-Sheet 2

INVENTORS.
George L. Hedges
Eugene F. Martinet
BY
ATTORNEY.

March 9, 1926. 1,576,276

G. L. HEDGES ET AL

AUTOMATIC ELECTRIC SWITCH AND CIRCUIT

Filed Dec. 20, 1922  3 Sheets-Sheet 3

INVENTORS.
George L. Hedges
Eugene F. Martinet.
BY
ATTORNEY.

Patented Mar. 9, 1926.

1,576,276

UNITED STATES PATENT OFFICE.

GEORGE L. HEDGES AND EUGENE F. MARTINET, OF CLEVELAND, OHIO, ASSIGNORS TO THE P. A. GEIER COMPANY, OF CLEVELAND, OHIO, A CORPORATION OF OHIO.

AUTOMATIC ELECTRIC SWITCH AND CIRCUIT.

Application filed December 20, 1922. Serial No. 608,074.

*To all whom it may concern:*

Be it known that we, GEORGE L. HEDGES and EUGENE F. MARTINET, citizens of the United States of America, residing at Cleveland, in the county of Cuyahoga and State of Ohio, have invented certain new and useful Improvements in Automatic Electric Switches and Circuits, of which the following is a specification.

Our invention relates to improvements in automatic electric switch and circuit and has for its object the provision of simple and convenient means for automatically controlling the circuits of electric motors and the like.

The switch embodying our invention and herein described as connected for the control of a single-phase induction motor, by way of exemplifying our improvement, comprises a compact rotary type of switching appliance adapted for starting, reversing and automatically opening the circuit of the connected motor under overload conditions. In addition, the appliance is so organized that the switch may not be thrown from one running position to the reverse running position until the motor has slowed down below a predetermined speed. This invariably insures reversal of a single-phase motor such as we have chosen for the purposes of explanation, although it should be understood that our invention is not limited to the type of motor nor to other details to which reference shall later be made herein.

Explaining first the switch of our invention in a preliminary way, we may say that it is of the double-pole, double-throw type having a neutral intermediate position; the contacts thereof being so arranged that an electromagnetic winding, such as a starting winding, connected with the switch, and a controlling electro-magnet within the switch are initially connected with the energizing circuit. The electromagnet of the switch is associated with a latch which prevents the complete connection from being established until the starting winding has become energized, and this winding, together with the electromagnet of the switch, are connected by means of a centrifugal switch, preferably in series relation therewith, whereby the starting winding and the electromagnet are automatically cut out of circuit when a predetermined or critical speed of the motor has been attained. Conversely, these associated elements, to-wit, the centrifugal switch and the electromagnet, with its controlled latch for normally holding the switch in its selected closed position, will operate to automatically open the main or controlling switch under overload conditions, by reason of the closure of the circuit through the electromagnet.

Further explanation may be more readily made and understood by referring to the accompanying drawings illustrating one embodiment or application of our invention, wherein:

Figure 1 is an enlarged view of our improved switch with the cover or casing removed and which illustrates the switch parts in their neutral or open position in association with a diagram indicating the control of a single phase motor.

Fig. 2 is a vertical section through the switch.

Fig. 3 is another plan view of the switch illustrating the initial movement of the switch contacts, while

Fig. 10 is a detail illustrating the latch and its co-acting lugs.

Fig. 11 is another detail illustrating the latch in a different position and its co-acting detent plate, and Fig. 12 is a fragmentary view showing the contact rings and centrifugal switch controlling the circuit including the starting winding and electromagnet.

Throughout the several figures of the drawings we have employed the same character of reference to indicate similar parts.

Figure 3:
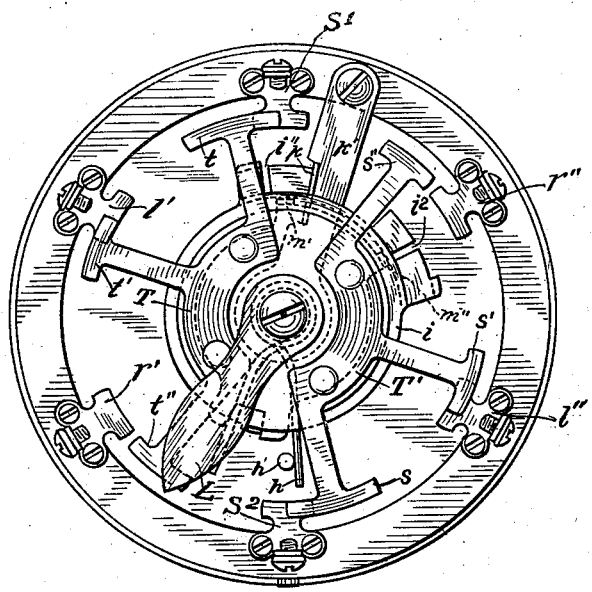
Figure 4:
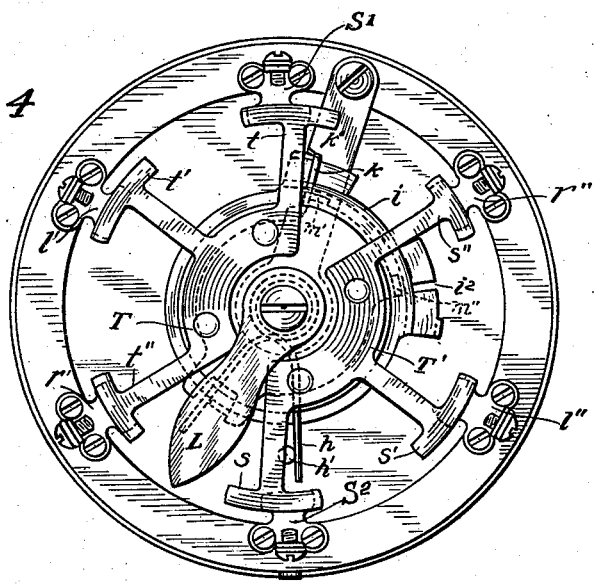
Fig. 4 is a similar view showing their final closed position.

Referring initially to Figure 1, it will be seen that the switching mechanism comprises six peripherally-positioned stationary contacts and a travelling or rotatable contact member having six contact arms respectively adapted to be brought into alternative engagement with the different stationary contacts or sets of contacts, upon the rotation of said member in one direction or the other from its neutral or off position. Essentially, the switch is a double-pole, double-throw knife switch reduced to rotary form and it is equipped with certain novel features hereinafter specified and previously adverted to, which make for safety in its employment with associated motor devices. The motor, of single-phase assumed for the purpose of illustration, is indicated by the diagrammatic showing of the contact rings, and associated centrifugal switch upon the left of the figure and by the indicated starting and motor windings in the lower portion of said figure.

Line conductors $L'$, $L''$ are shown connected with the corresponding contacts $l'$, $l''$ of the switch, while the starting winding S is connected between switch contacts $S'$, $S^2$ in series relation with the magnet windings $w$ later referred to and explained as to purpose and function. The contact rings C of the motor controlling the starting winding S are provided in the instance assumed with a centrifugal switch $c$ normally closed below a predetermined critical speed and while the motor is at rest. The motor windings proper, R, are connected between switch contacts $r'$ and $r''$.

The rotary or travelling contact member comprises two insulated triple-armed contacts T, T'; said arms having arc-shaped terminals $t$, $t'$, $t''$, $s$, $s'$ and $s''$ that are adapted respectively to engage the next adjacent contacts of the switch as the rotary contact member is turned in one direction or the other.

It will be observed that the contacts and contact arms are so disposed that connection is first established through the contacts $l'$ and $l''$ and through the contacts $S'$ and $S^2$ before contact is made respectively with the contacts $r'$ and $r''$. This is for the purpose of first cutting the starting winding S into circuit before the running winding R is connected to line.

The rotation of the travelling contact member is effected by means of the lever L which is mounted at the upper extremity of the central shaft exteriorly of the switch casing $a$. A sleeve $b$ is rotated by the lever L and serves to rotate in turn the interiorly positioned lever arm $d$, which through the medium of a spring $e$ imparts motion to the lever arm $f$ attached to the shaft $g$ of the switch.

A second spring $h$, reacting against the stationary pin $h'$, serves normally to maintain the associated parts, including the dished mounting plate $i$, which turns freely upon the shaft, in the intermediate or neutral position, so that all of the contacts are disconnected and the contact arms are positioned intermediately thereof, as shown in Fig. 1. It will be apparent, however, that the rotation of the travelling contact member with its interspaced contact arms in either direction must effect connection in different order and relation with the stationary contacts. As shown in Fig. 2, the arc-shaped terminals $t$, $t'$, etc., are duplicated or paired so that the members will engage the stationary contacts from both above and below to effect better connection therewith.

Figure 5:
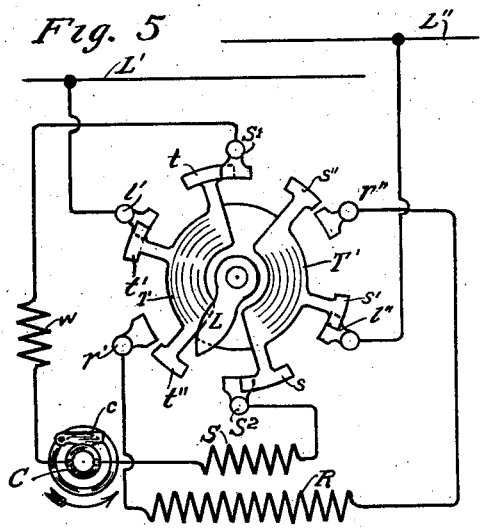
Fig. 5 is a diagram showing the circuit arrangement established with the switch parts as shown in Fig. 3.
Figure 7:
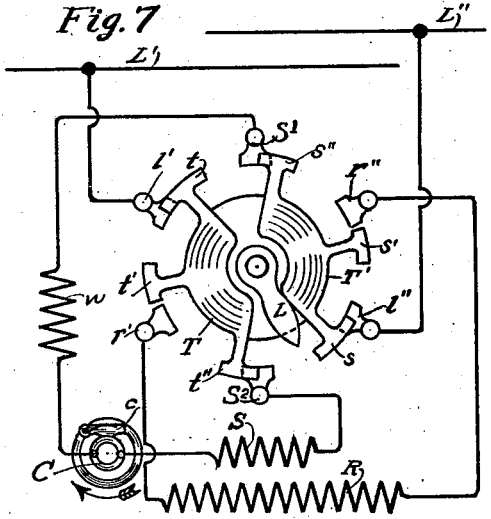
Figs. 7 and 8 are diagrams corresponding to Figs. 5 and 6, except with reverse position of the switch parts for effecting the clockwise rotation of the motor.

The spring $h$ normally maintains the terminals in their off position, but they may be freely turned against the tension of the spring from this position through a short arc so that the first two contacts of each set are interconnected, as indicated in the diagram of Fig. 5, or of Fig. 7. However, a latch $k$ on the armature $k'$ of the electromagnet $w'$, which is energized by the winding $w$, serves momentarily to prevent the further movement of the travelling contact member. This is accomplished through the engagement of the walls of slot $i'$ with said latch $k$, which almost instantaneously is retracted by the energization of the electromagnet and its actuation of the armature $k'$.

The completion of the circuit connections, i. e., with the running contacts $r'$, $r''$, immediately starts the motor which will pick up speed and thereupon open the centrifugal switch $c$ in the well known manner. This cuts out the starting winding S which initially was connected into circuit, together with the magnet windings $w$, so that electromagnet $w'$ is deenergized and the latch $k$ will engage one or the other of the slots $i''$, $i^2$, so that the travelling contact will remain in the running position as long as the motor operates at or above the critical speed.

In the event that the motor slows down from any cause, as from an overload, sufficiently to close the centrifugal switch $c$, however, the windings $w$ of the electromagnet are automatically cut into circuit, which causes electromagnet $w'$ to retract its armature and associated latch $k$. Thereupon the spring $h$ immediately restores the switch parts to normal or off position and all of the circuits, including the controlled motor, are disconnected from line.

Figure 6:
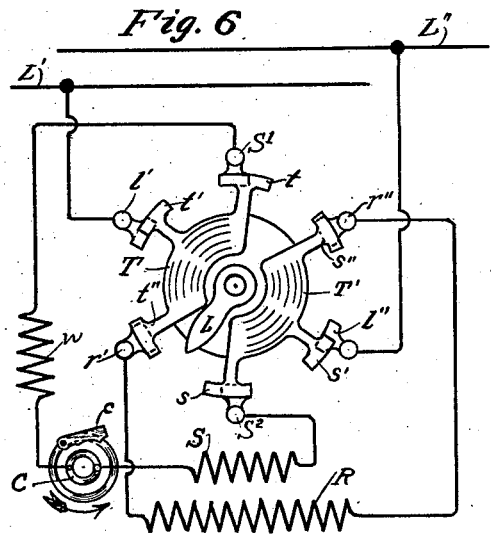
Fig. 6 is a similar diagram showing the circuit arrangement established with the parts as shown in Fig. 4; the operation of the motor being assumed as counterclockwise.
Figure 8:
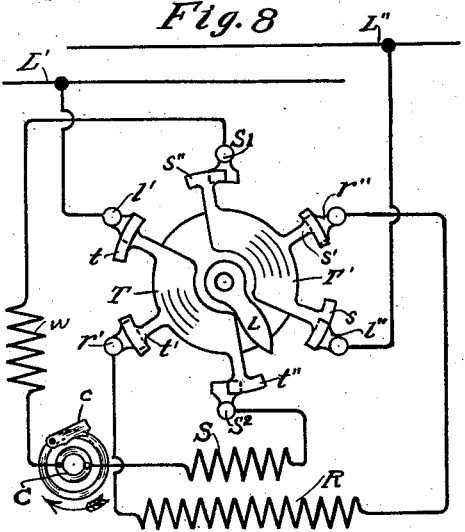
Figure 9:
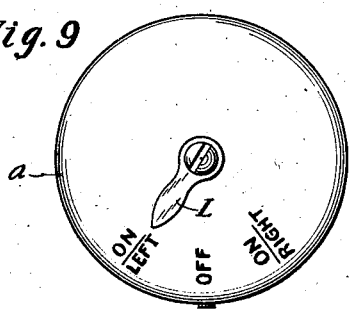
Fig. 9 is a plan view of the switch casing and controlling lever shown in normal size.

It will be noted that the diagrams of Fig. 6 and Fig. 8 respectively show the final or running position of the switch parts for operating the connected motor in opposite directions, while properly showing the centrifugal switch in its open position. It should be observed, however, that the centrifugal switch and single-phase motor, as sumed for the purposes of illustration, afford but one typical use for our improvement and the connections are not to be understood as being in any wise essential to our invention. It is quite apparent that other types of motor or electromagnetic appliances and other automatic switching mechanism may be associated with the switching appliance of our invention.

Since the latch $k$ maintains the switch in its on position, there necessarily is provided means for opening the circuit and stopping the motor. Such means are found in the lugs $m'$, $m''$ provided upon the disc $m$ which is rotated by the shaft $g$. Sufficient lost motion is permitted so that one or the other of these lugs will engage latch $k$ and release it from one or the other of the slots $i''$, $i^2$, whereupon the travelling contact member is free for restoration to its off position and the connected motor circuits will be disconnected from line.

It is quite unnecessary to explain that the reversal of the motor is effected by the reversal of current initially through the starting winding S, since this is well known practice. However, we may explain the fact that with our switch it is impossible to reverse the switch connections until the motor has slowed down below the critical speed, since the centrifugal switch $c$ remains open in the instance assumed, until the speed has fallen off, hence the latch $k$ will check the reverse movement of the switch to its complete circuit-closing position, as above explained, through its engagement with the walls of the slot $i'$ (Fig. 11). When the centrifugal switch is closed, circuit is immediately established through the starting windings S, or any other controlled circuit, together with the windings $w$ of the electromagnet within the switch, thereby releasing the travelling contact for its complete movement, only after the relative reversal of current through the starting windings, which accordingly insures the reversal of the motor.

Having now described an embodiment of our invention and explained a specific practical application thereof, we claim as new and desire to secure by Letters Patent, the following:

1. In an electric switch of the class described, the combination with switch contacts positioned for alternative engagement by the travelling contact member, of said travelling contact member normally maintained out of contact therewith, means temporarily blocking the final movement of the contact member to its contact-making positions, and electromagnetic means automatically operated for rendering the latter means temporarily inoperative, substantially as set forth.

2. In an electric switch of the class described, the combination with switch contacts positioned for alternative engagement by the travelling contact member, of said travelling contact member normally maintained out of contact therewith, a latch governing said contact member, and an automatically-operated electromagnetic device controlling said latch and contact member, whereby the latter may be automatically released to complete its travel or to open either of its alternatively closed contacts, substantially as set forth.

3. The combination with an electric switch of the class described, comprising switch contacts and a travelling contact member adapted to be brought into engagement therewith, together with electromagnetic blocking means for the latter, of a controlling centrifugal switch electrically connected with said blocking means, substantially as set forth.

4. The combination with an electric switch of the class described, comprising switch contacts and a travelling contact member adapted to be brought into engagement therewith, together with electromagnetic blocking and releasing means for the latter, of a controlling centrifugal switch electrically connected with said blocking and releasing means, substantially as set forth.

5. The combination with a starting and reversing switch, comprising alternative sets of starting and running contacts, a travelling contact member adapted alternatively to be brought into successive engagement with either set of contacts, together with electromagnetic blocking and releasing means associated with said member, of a starting winding and a centrifugal switch electrically connected with said blocking and releasing means and with said starting winding, substantially as set forth.

6. The combination with an electric switch of the class described, comprising switch contacts and a travelling contact member adapted to be brought into engagement with different sets of such contacts, together with blocking means for the latter, of a controlling centrifugal switch associated with said blocking means, substantially as set forth.

7. The combination with an electric switch of the class described, comprising alternative sets of switch contacts and a travelling contact member adapted to be brought into engagement with different sets of such contacts, together with blocking means and releasing means for the latter, of a controlling centrifugal switch associated with said blocking and releasing means, substantially as set forth.

8. In an electric switch of the class described, the combination with switch contacts positioned for alternative engagement by the travelling contact member, of said travelling contact member normally maintained out of contact therewith, means temporarily blocking the final movement of the contact member to either of its contact-making positions, and associated automatic means for rendering the latter means temporarily inoperative, substantially as set forth.

In testimony whereof we do now affix our signatures.

GEORGE L. HEDGES.
EUGENE F. MARTINET.